(No Model.)

J. P. WATHIER.
GAGE FOR HAIR SPRING STUDS.

No. 293,127. Patented Feb. 5, 1884.

Witnesses:
J. W. Stuckett.
W. J. Osgood.

Inventor:
Joseph P. Wathier
by Joseph Ridge
Attorney.

UNITED STATES PATENT OFFICE.

JOSEPH P. WATHIER, OF CHICAGO, ILLINOIS.

GAGE FOR HAIR-SPRING STUDS.

SPECIFICATION forming part of Letters Patent No. 292,127, dated February 5, 1884.

Application filed November 27, 1883. (No model.)

*To all whom it may concern:*

Be it known that I, JOSEPH P. WATHIER, of Chicago, county of Cook, and State of Illinois, have invented a new and useful Gage for Hair-Spring Studs for Time-Pieces, of which the following is a full and complete description, reference being had to the accompanying drawings.

My invention relates to a gage by means of which the proper position of the stud of a hair-spring may be determined at once, to adapt it to the particular make of watch for which it is designed.

To those skilled in the art it is well known that in order to get the escapement in beat it is necessary that the hair-spring stud with relation to the ruby-pin be such as to conform to the requirements of the particular make of watch for which it is designed. Heretofore this adjustment has been arrived at by an experimental process. To obviate this and facilitate the operation is the object of my invention.

Figure 1:
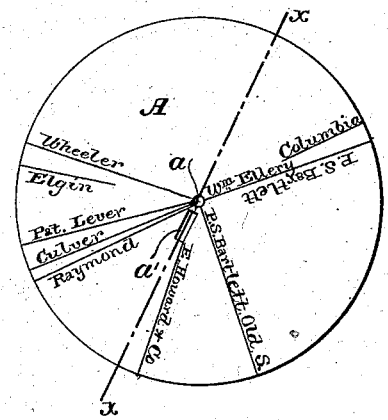
Figure 2:
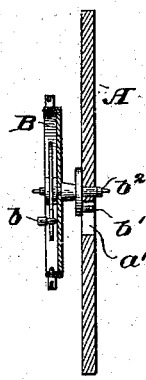

In the drawings, Figure 1 is a plan view. Fig. 2 is a cross-section through line $x\ x$ of the gage, showing also in cross-section the "balance" as when in position on the gage for adjustment of the hair-spring.

Centrally of disk A is an aperture, $a$, also adjacent thereto a slotted aperture, $a'$.

Respectively for each make of watches a standard position of the hair-spring stud may be relied upon to give the "in beat" to the escapement. In order to determine for any and all distinctive makes of watches what the proper position of the stud should be, respectively, it is first ascertained and indicated on the disk or dial A by radial lines—"P. S. Bartlett," &c.—whose focus coincides with aperture $a$. It is obvious, however, that any form of index that will insure the proper location of the stud will answer the purpose.

By reference to Fig. 2 of the drawings, B represents the balance, and $b$ the hair-spring stud. The ruby-pin $b'$ is shown inserted in the slotted aperture $a'$, and the balance-staff $b^2$ is inserted in the central aperture, $a$, of gage A. When the balance is placed on the gage A, as shown, it is only necessary to adjust the hair-spring so that stud $b$ corresponds in position to the radial line representing the particular make of watch to which the balance belongs, and the desired result is at once insured.

Having thus fully described my said invention, what I claim, and desire to secure by Letters Patent, is—

The disk A or its equivalent, provided with apertures $a$ and $a'$, or other means of locating the staff and ruby-pin, and an index for showing the proper position of the stud $b$, substantially as and for the purpose described.

JOSEPH P. WATHIER.

Witnesses:
 EDWARD A. FISHER,
 JOSEPH RIDGE.